April 21, 1970 R. A. HATHAWAY 3,507,435

SPEED CHANGER FOR CAPSTAN AND ROTATING HEAD IN A TAPE RECORDER

Filed Nov. 21, 1966 4 Sheets-Sheet 1

Inventor
RICHARD A. HATHAWAY

By Anderson, Luedeka, Fitch, Even, & Tabin Attys.

SPEED CHANGER FOR CAPSTAN AND ROTATING HEAD IN A TAPE RECORDER

Filed Nov. 21, 1966 4 Sheets-Sheet 2

Inventor
RICHARD A. HATHAWAY

By Anderson, Luedeka, Fitch, Even, & Tabin Attys.

SPEED CHANGER FOR CAPSTAN AND ROTATING HEAD IN A TAPE RECORDER

Filed Nov. 21, 1966

Inventor
RICHARD A. HATHAWAY

By Anderson, Luedeka, Fitch, Even, & Tabin Attys.

April 21, 1970 R. A. HATHAWAY 3,507,435

SPEED CHANGER FOR CAPSTAN AND ROTATING HEAD IN A TAPE RECORDER

Filed Nov. 21, 1966 4 Sheets-Sheet 4

Inventor
RICHARD A. HATHAWAY

By Anderson, Luedeka, Fitch, Even & Tabin Attys.

United States Patent Office 3,507,435
Patented Apr. 21, 1970

3,507,435
SPEED CHANGER FOR CAPSTAN AND ROTATING HEAD IN A TAPE RECORDER

Richard A. Hathaway, Des Plaines, Ill., assignor to Ampex Corporation, Redwood City, Calif., a corporation of California Filed Nov. 21, 1966, Ser. No. 595,828
Int. Cl. B65h *17/20;* F16h *11/08;* G11b *15/44*
U.S. Cl. 226—178 7 Claims

ABSTRACT OF THE DISCLOSURE

An apparatus for changing the rotational speed of a recording head and a capstan drive in a magnetic recorder including a belt shifting mechanism for moving belts from one rim to another on multiple rim pulleys. Lifters are provided for assisting the belt shifting mechanism in raising the belt onto a larger diameter pulley rim and for preventing excessive wear and stretching of belts.

This invention generally relates to a speed changer for a tape recorder and more particularly relates to an apparatus for providing a plurality of selectable driving ratios between a motor and a driven member which comprise components of a tape recorder.

It has been found desirable in conjunction with the operation of a tape recorder to provide a plurality of selectable recording and playback speeds. For example, the use of a relatively high tape speed will improve the high frequency fidelity of the recorded and corresponding reproduced signal; however, such high speed operation utilizes a considerable amount of tape for a given recording time. In certain applications, high fidelity is unnecessary; therefore, it is desirable to operate the recorder at a slower speed so as to conserve tape.

Various arrangements have heretofore been used to provide variable recording speeds. One well-known arrangement in an audio tape recorder includes a continuous belt having a circular cross section. The belt is passed about a driven pulley and about a driving pulley. The driving pulley has two rims. The rims of the driving pulley are separated by a shoulder to which is secured a symmetrical lifting member. Thus when the belt is urged in a direction parallel to the axis of the driving pulley the belt will be lifted from the smaller diameter rim to the larger rim by the lifting member, and when urged in the opposite direction will fall back onto the smaller rim thereby effecting a rotational speed change of the driven pulley. With such an arrangement the path over which the belt is traversed varies depending upon which pulley rim the belt is riding. When the distance between the pulley centers is large as compared to the variation in rim diameters, the percentage change in the various belt paths is relatively small. Thus, slightly elastic belts will easily accommodate such a variation without binding or slipping. In situations where the distance between pulley centers is small as compared to the change in rim diameters, the belt is caused to traverse paths which vary greatly in length resulting in undesirable binding and/or slipping of the belt. The instant invention is directed toward an apparatus for overcoming this difficulty. More particularly, it is directed to a drive system wherein the rim diameters of the pulleys are large relative to the distance between the pulley centers and wherein substantially constant belt tension is maintained regardless of the belt path traversed.

While the drive system may be employed to drive the capstan and/or the take up reel in an audio recorder, it has particular advantages in a helical scan video recorder. In the operation of a video tape recorder it is generally necessary to shift both the speed of the capstan together with the speed of the rotary recording head so that they will be caused to track together. One method of accomplishing this end is to drive the capstan by means of a shiftable belt system such as that previously decribed and to use a servo system to control the speed of the motor which drives the recording head to provide the necessary tracking. With such an arrangement, it is difficult and expensive to provide a servo system that will properly track the recording head speed with the capstan over a wide range of operational speeds. Further, when the speed of the capstan is varied a significant amounts, such as when instituting a 2:1 speed change, there is often a significant time lag and strain upon the servo system during its attempt to reach an equilibrium position.

A main object of the present invention is to provide an improved tape recorder speed changing apparatus providing selective recording and playback speeds. A more particular object is to provide a speed changing apparatus for a tape recorder which includes two cooperating pulleys each of which is provided with a plurality of rims selectively coupled by means of a belt. A further object is to provide a shifting mechanism for simultaneously changing the rotational speed of the capstan and recording head of a video tape recorder where each of said components is provided with such a speed changing apparatus.

Other objects and advantages of the present invention will become apparent through reference to the following description and accompanying drawings which show an illustrative embodiment of the invention in which.

Figures 1, 2:
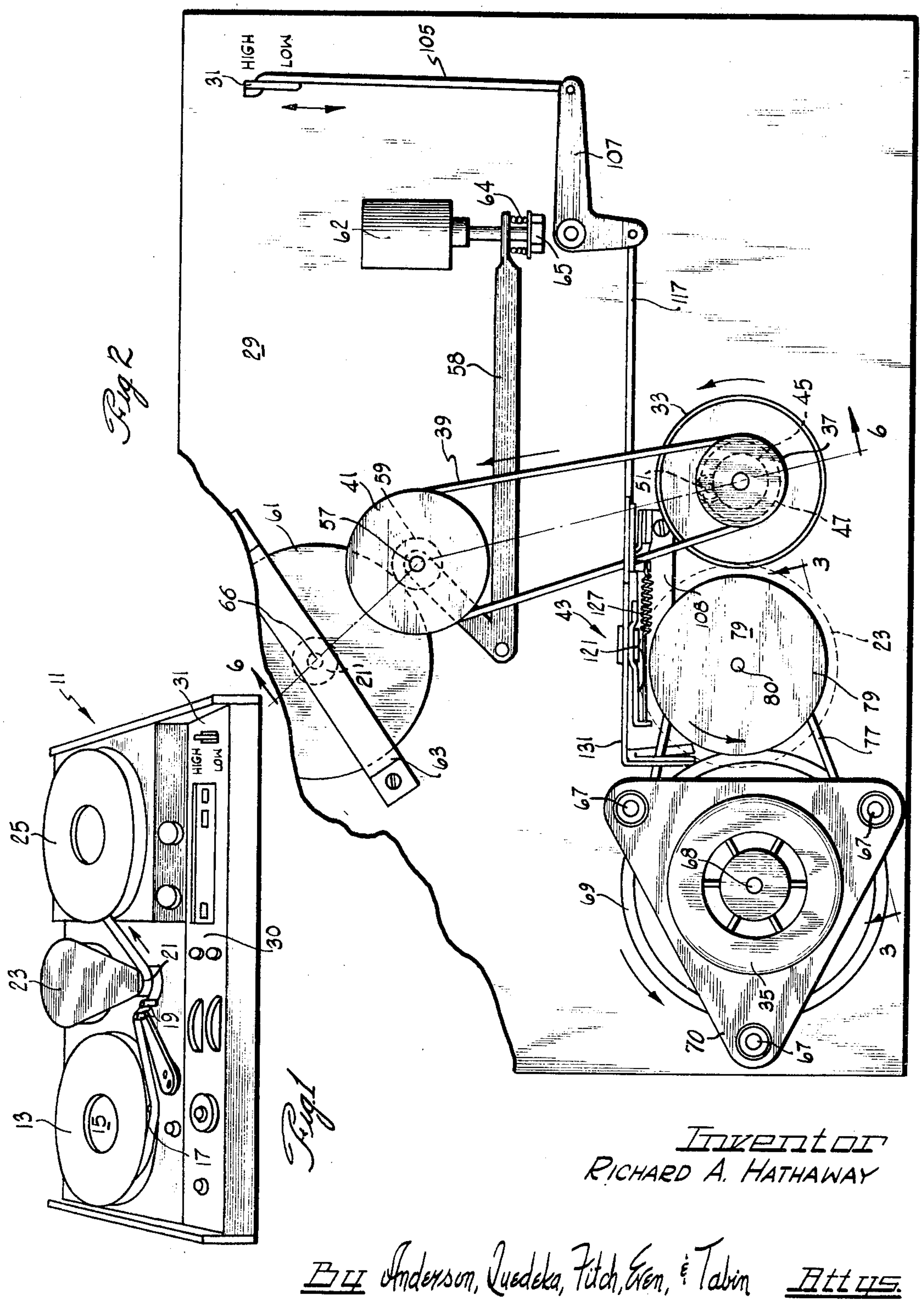
FIGURE 1 is a perspective view of a video tape recorder including a speed changing apparatus in accordance with this invention.
FIGURE 2 is a bottom plan view of the apparatus of FIGURE 1 with those components deleted which do not form a part of the speed changing apparatus.

Referring to the perspective view of FIGURE 1, a video tape recorder 11 includes a tape supply reel 13 mounted upon a supply turntable 15. A tape 17 wound on the reel 13 is passed about guide members 19 and about a capstan 21. The tape 17 passes from the capstan 21 around a rotating scanning assembly 23 having a video recording and reproducing head mounted thereon, about the capstan again to a take up reel 25. The entire apparatus is mounted upon a chassis 29 covered by a panel 30 whereon various operating controls are mounted. The video tape recorder 11 illustrated in FIGURE 1 is similar to the recorder described in the co-pending application of Delmar Ronald Johnson and Richard Allen Hathaway entitled "Capstan & Wind Drives & Their Activation Mechanisms," Ser. No. 466,254, filed June 23, 1965, now Patent No. 3,355,119 issued Nov. 28, 1967. The reader is directed to said co-pending application for a more detailed description of the general operation of the recorder illustrated.

The recorder of FIGURE 1 further includes a manually operated speed changing lever 31 which is provided with two stable positions designated low and high corresponding respectively to low and high speed operation. By operation of the switch or lever 31 the user may select the rotary speed of the capstan 21 and the rotary scanning assembly 23 and thereby determine the speed at which the tape 17 passes through the recorder and the speed at which the transducing head traverses the tape. For example, the effective recording speed may be 500 inches per second at the low speed and 1000 inches per second at the high, or standard speed.

Figure 6:
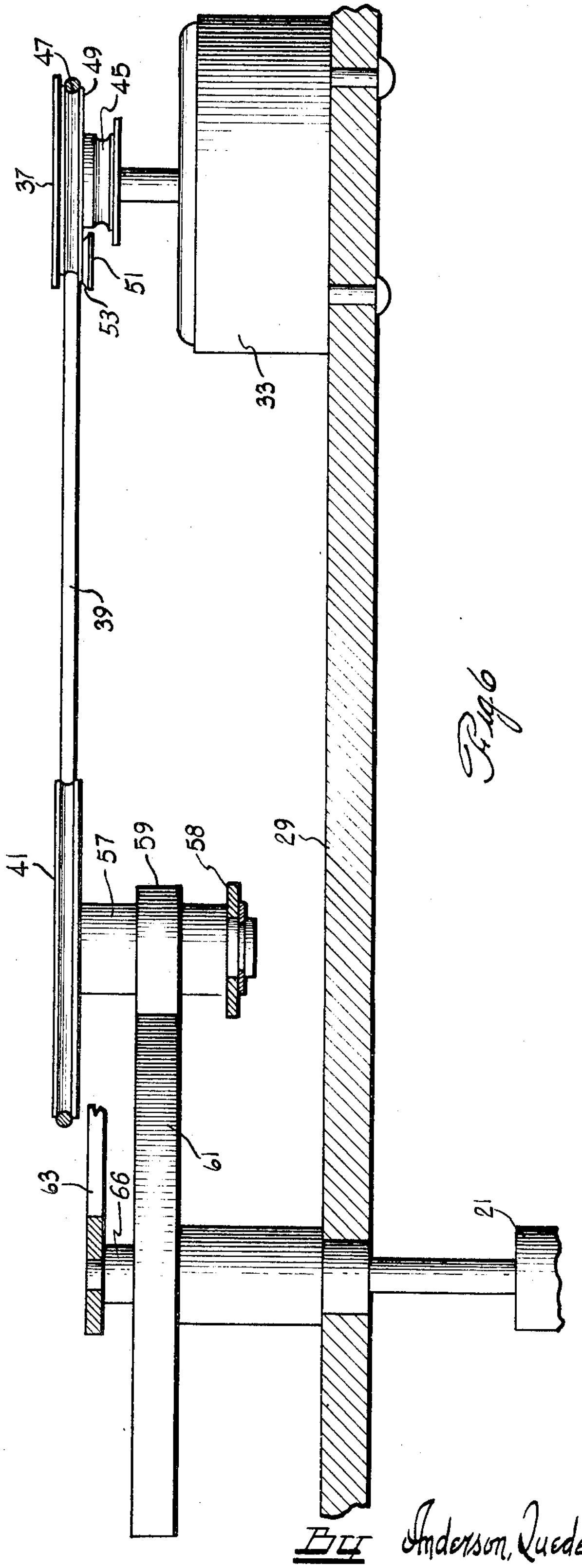
FIGURE 6 is a partial sectional view taken generally along the line 6—6 of FIGURE 2.
Figure 9:
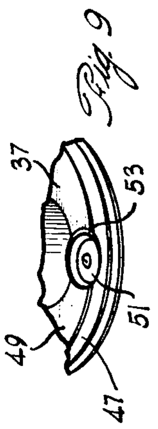
FIGURE 9 is an enlarged perspective view of a belt lifter secured to one of the pulleys illustrated in FIGURE 6.
Figure 8:
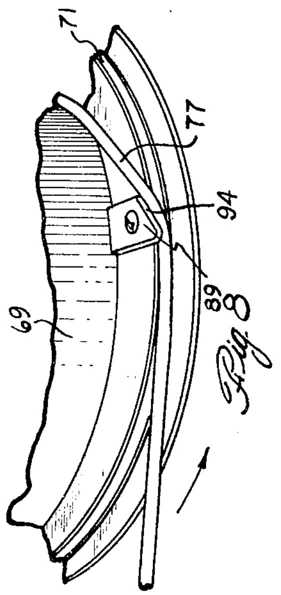
FIGURE 8 is a perspective view of another of the pulleys of FIGURE 2 and the lifter thereon in still another position of engagement with its cooperative driving belt.

Referring to FIGURE 2, the capstan 21 and rotary scanning assembly 23 are driven by a capstan motor 33 and a scanning motor 35 respectively. The motors are positionally mounted upon the apparatus as shown. Fixed to the capstan motor 33 is a flanged dual rimmed driving pulley 37, each rim, as shown in FIGURE 6, being grooved to receive and center an elastic belt 39 having a circular cross section. The belt 39 is passed about a flanged driven pulley 41 and through a belt shifting mechanism 43 (FIGURE 2) which will be hereinafter more clearly described. As illustrated in FIGURE 6, the driving pulley 37 is provided with small 45 and larger 47 diameter rims for respectively driving the capstan 21 at high and low speeds. Secured to a shoulder 49 of the driving pulley 37 is a lifter 51. The lifter 51 is provided with a conical surface 53 which is disposed toward the larger rim 47 and is clearly illustrated in FIGURE 9.

The driven pulley 41 is rigidly mounted on a shaft 57 journaled in a bearing supported on one leg of an L-shaped moveable frame 58. The shaft 57 has a hub 59 secured thereto for frictional engagement with a capstan wheel 61 which is fixed to the capstan 21. The elbow of the frame 58 is rotably secured to the chassis 29 and the free end of the frame 58 is secured to the plunger of a play engagement solenoid 62. The solenoid plunger is passed through the free end of the frame 58 and held captive thereon by a spring 64 and a nut 65. Upon energization of the solenoid 62, the hub 59 is urged in frictional engagement with the wheel 61. The capstan 21 and wheel 61 are rigidly supported on a common shaft 66 journaled in a bearing through the chassis 29 and in a bearing supported by a bracket 63. Thus, the capstan motor 33 drives the pulley 41 and hub 59 which in turn rotates the capstan wheel 61 and capstan 21 causing the tape 17 to move through the recorder 11.

The belt 39 when positioned upon the large pulley rim 47 drives the capstan 21 at a high speed and when upon the smaller rim 45 provides slow speed drive. As previously mentioned, the belt 39 is shifted from the slow speed to the high speed rims by means of the shifting mechanism 43. For purposes of discussion it will be assumed that the belt 39 is upon the smaller rim and is shifted to the larger rim to increase the capstan 21 speed. The shifting mechanism 43, as will be described hereinafter, is adapted to urge the belt slightly away from the chassis 29 so that the conical surface 53 of the lifter 51 will engage the belt and lift it to the larger rim 47. Correspondingly, to return to low speed operation, the belt is urged toward the chassis 29 causing it to drop from the larger rim 47 to the smaller rim 45 thereby effecting a speed decrease. It should be noted that the distance between the pulley centers is quite large when compared with the difference in pulley 37 rim diameters. Thus, the change in the length of the path which the belt traverses when the belt is shifted from high speed to low speed operation is relatively small when compared to the total length of the belt. This small percentage change is easily accommodated by the belt elasticity thereby eliminating binding and/or slippage.

The scanning assembly drive includes the scanning motor 35 which is mounted upon a triangularly shaped support plate 70 secured to the chassis 29 by three cylindrical standoffs 67. Fixed to the motor shaft 68 is a flanged scanning motor driving pulley 69 having a large, high speed rim 71 and a small, low sped rim 73 separated by a generally planar shoulder 74 (see FIGURE 3). The high speed rim 71 is provided with a groove 75 for receiving a belt 77 having a circular cross section. The belt 77 is passed over the driving pulley 69 and about a flanged scanning assembly driven pulley 79. The driven pulley 79 is mounted on a shaft 80 journaled in a bearing through the chassis 29 and secured to the scanning assembly 23 for rotation thereof. The driven pulley 79 is provided with large 81 and small 83 rims separated by a generally planar shoulder 84. The rims 81 and 83 correspond to low and high speed operations respectively. The rims 81 and 83 are aligned with the rims 73 and 71 respectively, and are provided with peripheral grooves 85 and 87 for guiding the belt 77. Thus, when the belt 77 is riding on the large rim 71 of the motor pulley 69 and on the small rim 83 of the pulley 79, the scanning assembly 23 is rotated at high speed and correspondingly when the belt is riding on rims 73 and 81, the scanning assembly is operated at low speed. The high and low speed designations of the scanning assembly correspond to the speeds of the capstan driven previously mentioned.

Figures 3, 4:
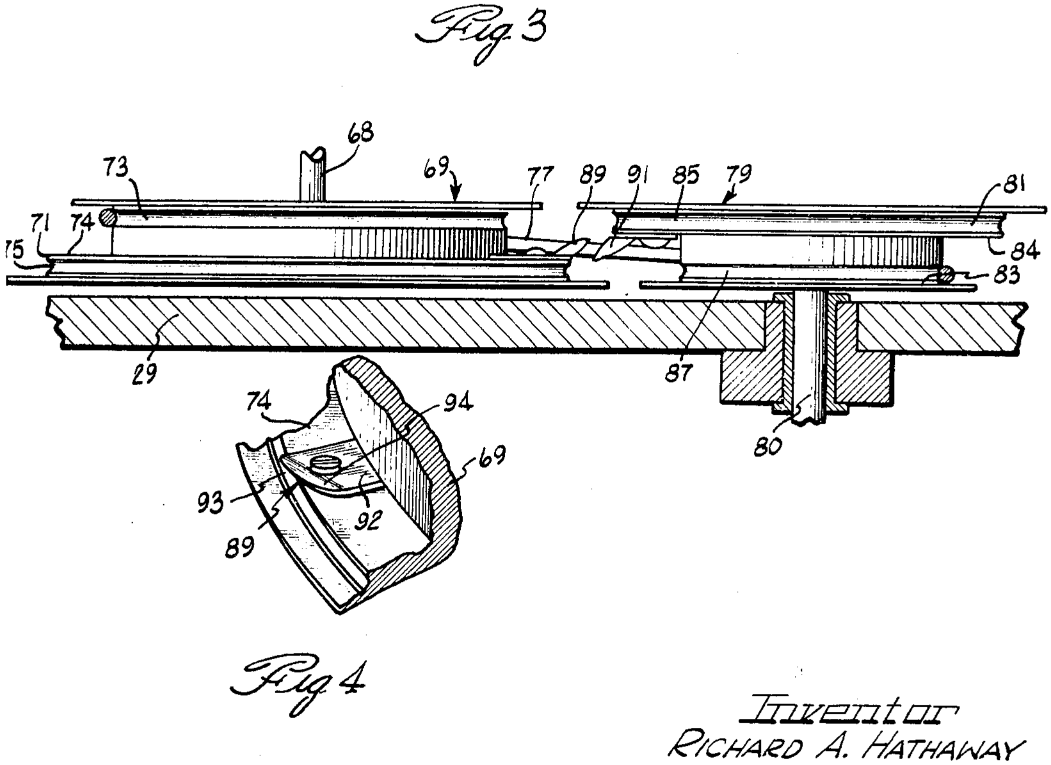
FIGURE 3 is an enlarged side view of the pulleys showing the lifters thereon taken partly in section generally along the line 3—3 of FIGURE 2.
FIGURE 4 is an enlarged perspective view of a belt lifter secured to one of the pulleys illustrated in FIGURE 4.

Secured to each of the shoulders 74 and 84 are similarly shaped asymmetrical lifters 89 and 91 of developed shape for lifting the belt from the lower to the upper rim of the corresponding pulley in response to actuation of the shifting mechanism 43. Referring to FIGURE 4, the lifter 89 includes a flat tab 92 for securing the lifter to the shoulder 74. The lifter provides two belt contracting surfaces; namely, a lifting surface 93 disposed toward the rim 71 which is shaped to engage the belt 77 and lift it onto the rim 71 and a deflecting surface 94 shaped to deflect the belt away from the rim 71. To provide such dual acting surfaces, the lifter is bent at an angle of about twelve degrees with respect to the tab 92 and at a slight angle with respect to the rim 71. The lifter 91 is similarly shaped.

Figure 7:
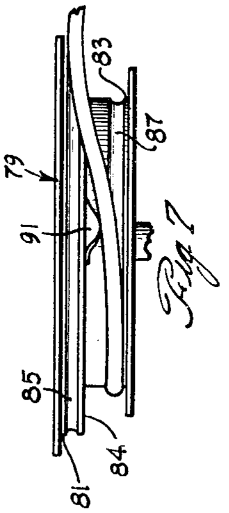
FIGURE 7 is an elevational view of one of the pulleys of FIGURE 2 and the lifter thereon in one position of engagement with the driving belt.
Figures 10, 11:
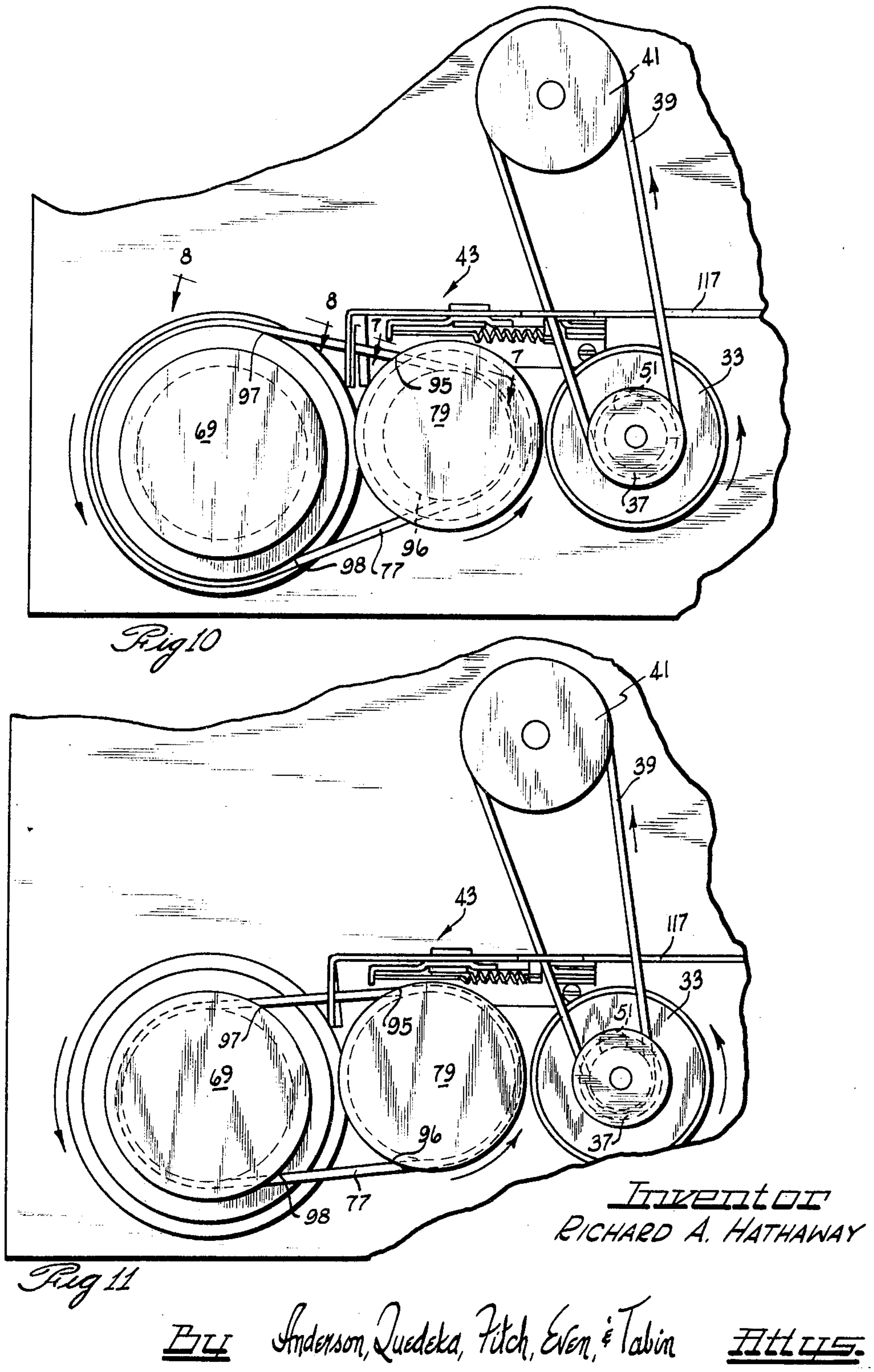
FIGURE 10 is a partial view of the apparatus of FIGURE 2 with some of the components removed showing the various pulleys and their cooperating belts in one driving arrangement.
FIGURE 11 is a view similar to FIGURE 10 with the various pulleys and their cooperating belts in still another driving arrangement.

For purposes of the following discussion it will be assumed that the scanning assembly is operating in its high speed condition of FIGURES 2 and 10. The shifting mechanism 43 is then actuated urging the belt toward the smaller rim 73 of the pulley 69, causing the belt to fall from the rim 71 to the rim 73 thus obtaining the position of FIGURE 3. The lifter 91 is secured to the shoulder 84 of the pulley 79 and as the lifter is moved from the inside of the belt loop to the outside thereof it engages the belt 77 as at point 96. The belt is thus lifted and moved over onto the larger rim 85 so as to traverse the path illustrated in FIGURE 11. Depending upon the position of the lifter 91 at the time the mechanism 43 is actuated, the lifter may pass from the outside of the belt loop toward the inside thereof and be caused to pass beneath the belt as at point 95. In such instances, the deflecting surface of the lifter will deflect the belt away from the shoulder 84 of the pulley without grabbing or otherwise catching the belt as illustrated in FIGURE 7.

To return the assembly to high speed operation of FIGURES 2 and 10, the shifting mechanism 43 is again actuated thereby urging the belt 77 toward the chassis 29 causing the belt to fall from the large 85 to the small rim 83. As the belt falls to the rim 83, the lifter 89 engages the belt as it passes from the inside to the outside of the belt 77 loop as at 97. The lifter 89 lifts the belt and urges it over onto the larger rim 71. Should the lifter 89 be caused to pass from the outside to the inside of the loop beneath the belt before engagement thereof as at 98, the deflecting surface 94 of the lifter will allow smooth passage beneath the belt without causing it to grasp or otherwise snag the belt. Thus actuation of the shifting mechanism will selectively move the belt between the paths illustrated in FIGURES 10 and 11.

Figure 5:
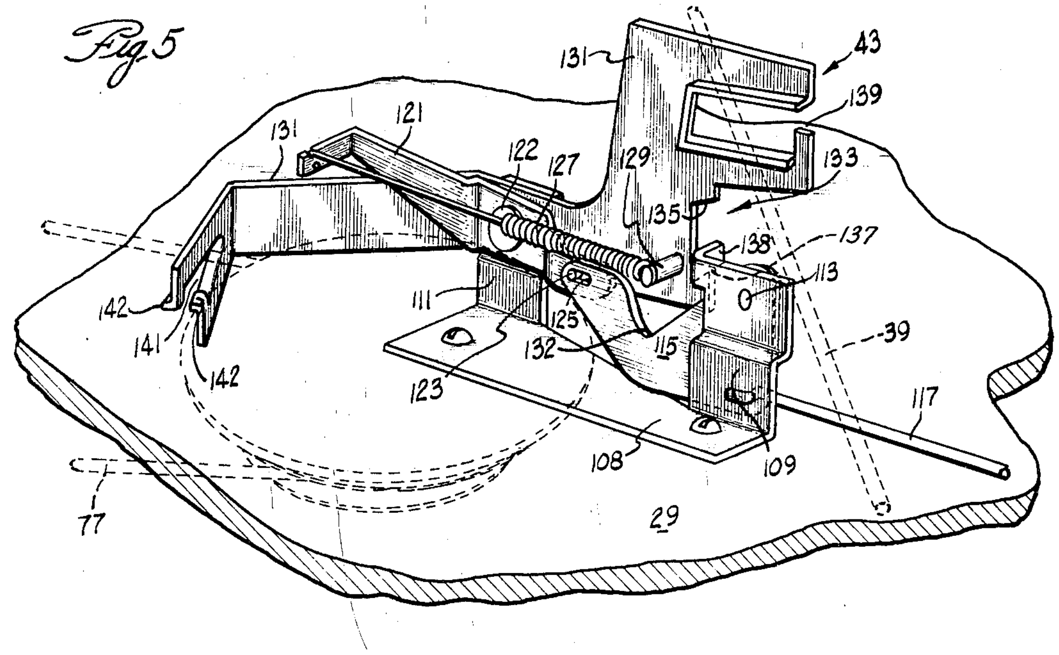
FIGURE 5 is an enlarged perspective view of a belt shifter which forms a component of the apparatus of FIGURE 2.

The shifting mechanism 43 illustrated in FIGURES 2 and 5 is actuated by the lever 31 which is pivotally secured to the chassis 29. The lowermost end of the lever 31 is connected to a rod 105 the other end of which is connected to one leg of a belt-crank 107, journaled to the chassis 29 for rotation about its elbow. The shifting mechanism 43 comprises a mounting bracket 108 fastened to the chassis 29 and including two upright standards 109 and 111. An L-shaped trip lever 115 is rotatably connected at one end of the upright standard 109 for rotation about a pivot 113. The elbow of the trip lever 115 is connected to the other leg of the bell-crank 107 by a second connecting rod 117, which is pivotally connected at each end. A spring support 121 is pivotally mounted on a pin 122 secured to the upright support 111. The spring support 121 comprises an elongated flat strip and is mounted for rotation about a point near its center. At one end the support 121 is provided with a stud 123 which is retained within an elongated slot 125 in the free leg of the trip lever 115. The mechanism 43 is maintained in one of two selective stable positions by a coil spring 127 one end of which is secured to the end of the spring support 121 on the side of the pin 122 remote from the stud 123. The remaining end of the spring is secured to a spring support stud 129 provided upon a belt positioning member 131. It should be noted that the position of the spring stud 129 upon the positioning member 131 coincides with a recess 132 provided in the trip lever 115. The member 131 is commonly pivotally mounted with support 121 upon the pin 122. The positioning member 131 is provided with a notch 133 having two bearing surfaces 135 and 137 for engaging a stop 138 projecting from the standard 109 when the shifting mechanism has reached one of its two limits of travel. The shifting mechanism 43 is provided with a capstan belt jaw 139 and a scanning belt jaw 141 for receiving the belts 39 and 77 respectively, the respective jaws being on opposite sides of the pivot pin 122. The plane of the jaw 141 which engages the scanning belt 77 is at right angles to the body of the shifting member 43. The jaws are provided with polished bearing surfaces to permit the smooth passage of the belt thereover. The bearing surfaces of the jaw 141 are slightly askew and provided with tabs 142 to provide a locking action about the belt thereby preventing the belt from being accidentally dislodged from the jaw during operation.

As the lever 31 is moved from one position to the other, the over-center action of the shifting mechanism 43 and its associated spring 127 moves the member 131 until the stop 138 comes in contact with one of the bearing surfaces 135 and 137 of the notch 133. The shifting mechanism 43 is thus provided with two stable positions corresponding to low and high speed operation. When the rod 117 is shifted to the right as viewed in FIGURE 5, the spring support end of the support 121 is rotated toward the panel 29 thereby causing the longitudinal axis of the spring 127 to move past the axis of rotation of the support 121 about pin 122, whereupon the spring 127 pulls the stud 129 toward the panel 29 until movement is stopped by engagement of the surface 135 with the stop 138. Thus, the jaw 139 is moved toward the chassis 29 and the jaw 141 away from the panel resulting in the simultaneous shifting of both belts 39 and 77 from high to low speed operations.

To return to high speed operation, as illustrated in FIGURE 10, the rod 117 is shifted to the left causing the over-center action of the mechanism 43 to shift the jaws 139 and 141 to the high speed positions shown in FIGURE 5. As previously mentioned, the over-center action of the mechanism 43 provides two stable positions corresponding to slow and high speed operations, respectively. The inclusion of such an over-center feature rapidly shifts the belt and provides a positive action thereby preventing the belt from assuming a loose position about the small rims 73 and 83. When the mechanism 43 is moved into the position of FIGURE 5, the capstan belt jaw 139 urges the belt 39 away from the panel, causing the belt to be lifted from the smaller rim 45 to the larger rim 47 by the lifter 51 thereby effecting a speed increase in the rotational speed of the capstan. Simultaneously, a bearing surface of the scanning jaw 141 engages the belt 77 urging it toward the chassis 29. As the pulleys 69 and 79 rotate, the lifter 89 engages the scanning belt 77 lifting it to the large rim 71 of the pulley 69. Also, the belt is caused to fall from the larger rim 81 of the scanning pulley 79 to the smaller rim thereof, resulting in a rotational speed increase of the scanning assembly 23.

To return the apparatus to low speed operation, as illustrated in FIGURE 11, the speed lever 31 is moved to the low position. The rod 117 is thus moved to the left causing the spring carrying end of support 121 to move toward the chassis thereby pulling the stud 129 into the notch 132. The capstan belt jaw 139 urges the capstan belt towards the chassis 29, so that as the capstan pulley 37 rotates, the belt will fall from the larger rim 47 to the smaller rim 45 thereby decreasing the rotational speed of the capstan. As previously mentioned, the change in the path which the belt 39 traverses between the high and low speed operation is relatively small when compared to the total length of the belt. Thus, the stretching of the belt accommodates the change in length and the tension of the belt is maintained relatively constant regardless of the speed at which the capstan is driven. The scanning jaw 141 urges the scanning belt 77 away from the surface of the chassis 29, and as the pulleys 69 and 79 rotate, the lifter 91 deflects the belt (FIGURE 7) as it passes from the inside to the outside of the belt loop without engaging the scanning belt 77 adjacent the scanning jaw 141. Due to the shape and development of the lifter 91, the deflecting surface allows the lifter to push the belt 77 up as the belt 77 leaves the pulley 79 and to pass beneath the belt 77 without catching or otherwise grabbing it. Upon reaching point 96 where the belt 77 is moving onto the pulley 79, the lifter 91 is shaped to enter the space between the pulley 79 and the incoming belt and an angle different than at the outgoing belt travel and lifts the belt 77 onto the larger rim 81 of the scanning pulley 79. Simultaneously, the belt is pulled by the jaw 141 from the rim 71 of the motor pulley 69 to the smaller rim 73 thereby reducing the speed at which the scanning assembly is rotated. It should be noted that the rim diameters of the pulleys 69 and 79 are so selected that regardless of which rims the belt is caused to ride, the paths traversed are substantially equal thereby eliminating any substantial change of length which would cause binding and/or belt slippage. It should be further noted that the relative ratios between the various pulleys and the speed of the motors may be varied as desired without departing from the spirit and scope of this invention. Since the capstan and scanning assembly are shifted together the range of control over which the speed regulating servo must operate may be substantially less than would be the case if only the drum were shifted and the servo used to track the drum with the capstan. Further, the shifting mechanism 43 may be actuated by alternate means without departing from the spirit and scope of this invention. For example, the plunger of a dual coil solenoid may be coupled to the member 115 so that upon energization, each of the solenoid coils will correspondingly shift the mechanism 43 to one of its stable positions. This is particularly advantageous during playback, where a signal on the recorder tape could be used to produce an automatic shift in tape speed where there occurred a change in the speed during recording.

In accordance with the foregoing, a speed shifting apparatus has been provided which includes an improved means of selectively changing the operational speed of a tape recorder.

Although but one specific embodiment of this invention has been hereinbefore shown and described, it will be understood that the details and construction may be altered without departing from the spirit and scope of this invention as defined by the following claims:

What is claimed is:

1. A speed changing apparatus for varying the speed ratio between a motor and a rotatable assembly in a recording device comprising a driving pulley coupled to said motor for rotation therewith, said driving pulley having a plurality of continuous rims of different respective diameters, each rim having a groove adapted to receive an endless belt forming a closed loop, a driven pulley coupled to said rotatable assembly, said driven pulley having an axis of rotation substantially parallel to that of said driving pulley and a plurality of continuous rims of different respective diameters positioned for co-operation with respective rims of said driving pulley, each rim having a groove adapted to receive an endless belt forming a closed loop, an endless belt mounted on a pair of co-operating rims of said driving and driven pulleys and extending therebetween, the diameters of respective rims of said pulleys being inversely related so that the path lengths of said belt over respective pairs of said co-operating pulley rims are substantially equal and so that the tension of said belt is substantially constant regardless of the pulley ratio selected, a lifter secured to each of said pulleys and extending radially and axially from the largest diameter rim of each pulley, and means for selectively urging said belt toward the lifter on one of said pulleys so as to cause said lifter to engage said belt and shift same to the adjacent larger pulley rim, said means simultaneously urging said belt onto the co-operating smaller diameter rim of the other of said pulleys, thereby varying the driving ratio between said motor and said assembly while maintaining relatively constant belt tension.

2. An apparatus in accordance with claim 1 wherein each of said pulleys includes a large and a small diameter rim separated by a generally planar shoulder and wherein one of said lifters is secured to and extends radially and axially beyond the respective shoulder of each pulley.

3. An apparatus in accordance with claim 1 wherein the lifter of at least one pulley is formed with a lifting surface and a deflecting surface, said lifting surface generally facing one rim and being adapted to assist said urging means by engaging said belt and lifting it onto said one rim from a smaller rim at the point in its path where the belt is moving into contact with said smaller rim, said deflecting surface being adapted to engage said belt when said urging means urges said belt toward said one rim at the point in the rotation of the respective pulley where said belt is moving out of contact with the smaller rim and to deflect said belt from said lifter without snagging.

4. An apparatus in accordance with claim 3 wherein said urging means further includes a mechanism supporting spaced bearing surfaces each of which is positioned upon an opposite side of said belt with respect to the other, and means for shifting said surfaces along a path generally parallel to the axis of said pulleys so as to urge said belt selectively into engagement with either of said lifters.

5. An apparatus in accordance with claim 4 wherein said mechanism includes biasing means for urging said mechanism into one of two stable positions corresponding to the two selectable paths of said belt.

6. An apparatus in accordance with claim 5 including second driving and driven pulleys mutually coupled by a second endless belt forming a closed loop, the axes of said second pulleys being parallel, said second driven pulley being coupled to a rotary capstan, and at least one of said second pulleys having a plurality of rims of different diameters, and a lifter secured to said plural rim second pulley, and wherein said urging means urges said second belt axially of said plural rim second pulley so as to move said second belt selectively into engagement with said lifter thereby causing said second belt to shift from one of said rims to the next adjacent larger diameter rim, thereby effecting a speed change of said second driven pulley.

7. An apparatus in accordance with claim 6 wherein said urging means further comprises a pair of spatially positioned second bearing surfaces positioned about said second belt, said second bearing surfaces being secured for co-operative movement with said first bearing surfaces so as to simultaneously, selectively shift the driving ratio of both said first pulleys and said second pulleys.

References Cited

UNITED STATES PATENTS

| | | | |
|---|---|---|---|
| 3,431,353 | 3/1969 | Kihara et al. ------ | 179—100.2 |
| 2,377,697 | 6/1945 | Kenworthy --------- | 74—242.4 |
| 3,248,961 | 5/1966 | Bortzfield et al. ---- | 74—242.3 |

BERNARD KONICK, Primary Examiner

J. R. GOUDEAU, Assistant Examiner

U.S. Cl. X.R.

226—188; 74—217, 242.3; 179—100.2; 274—11